United States Patent Office 3,583,901
Patented June 8, 1971

3,583,901
CORROSION CONTROL IN HYDROCONVERSION EFFLUENT PIPING BY $NH_4^+$ CONTROL
Robert L. Piehl, Richmond, Calif., assignor to Chevron Research Company, San Francisco, Calif.
Filed Feb. 3, 1969, Ser. No. 795,882
Int. Cl. C23f 11/04
U.S. Cl. 208—47
1 Claim

ABSTRACT OF THE DISCLOSURE

It has been found that for hydroconversion effluent piping the corrosion is apparently a function of the amount of $NH_3$ in the reactor effluent as well as the amount of $H_2S$ in the reactor effluent. To control the corrosion, water is injected into the reactor effluent not just in response to the amount of $H_2S$ present but also the amount of $NH_3$ present to control the $NH_4HS$ concentration to less than 1.1 mole percent for the aqueous phase in the separator following the hydroconversion reactor.

BACKGROUND OF THE INVENTION

Field of the invention

This invention relates to corrosion control. More particularly, the present invention relates to control of corrosion in a hydroconversion unit reactor effluent piping and heat exchanger tubing wherein $H_2S$ and $H_2O$ are present.

Description of the prior art

In this specification by "hydroconversion" is meant any of those processes wherein hydrocarbons are reacted with hydrogen in order to convert the hydrocarbons to more valuable hydrocarbons. Thus, hydroconversion is meant to include processes such as hydrotreating, hydrofining, hydrodesulfurization, hydrodenitrification, hydrocracking, etc. In a typical hydroconversion process pertinent to the present invention, hydrogen is reacted with hydrocarbons in a catalytic system maintained at high pressure and elevated temperature, and sulfur and nitrogen compounds in the hydrocarbon feedstock are converted to hydrogen sulfide and ammonia, respectively.

According to known prior art practices, $H_2O$ is injected into a hydroconversion reactor effluent in order to remove $NH_3$ from the recycle gas. For example, in U.S. Pat. 3,157,590 an invention is disclosed wherein ammonia is removed from a gaseous hydrogen recycle stream to a hydrocracker by water washing the reactor effluent. The invention in U.S. Pat. 3,157,590 is based on the discovery that greatly improved catalyst activity and per-pass conversion in an isomerization-cracking zone can be obtained even with feed streams containing as much as 500 parts per million nitrogen by so modifying the process that the gaseous recycle stream supplied to the isomerization-cracking zone is substantially free of ammonia. One of the methods proposed for removing ammonia is water washing. A large quantity of water is not required in this instance since it is merely desired to remove the $NH_3$ from the recycle hydrogen gas and the $NH_3$ is very soluble in water.

It is also known that it is desirable to add sufficient water to wash solids out of hydroconversion effluent piping. Again, because ammonia is very soluble in water and also the resulting ammonium hydrosulfide ($NH_4HS$) compound is very soluble (up to 50 percent, by weight) in water, usually large quantities of water are not needed to prevent formation of solid deposits in hydroconversion reactor effluent piping.

Further it is known that $H_2S$ causes corrosion in various systems. However, it is generally thought that the presence of $NH_3$ lowers the corrosion rate. For example, in U.S. Pat. 3,189,537 a method is disclosed for minimizing corrosion by injecting ammonia into the upper portion of a crude oil distillation column. According to U.S. Pat. 3,189,537, acidic components which are present in the crude oil cause corrosion in the presence of an aqueous medium.

In a typical hydroconversion process the reactants from the hydroconversion reactor are generally cooled from about 700 or 800° F. to about 100 to 150° F. in order to separate recycle hydrogen gas from the bulk of the hydrocarbon effluent. This cooling is accomplished by one or more heat exchangers which may be air-cooled heat exchangers and/or water-cooled heat exchangers. The cooled reactor effluent is introduced to a high pressure separator. Recycle hydrogen is withdrawn from the top of the high pressure separator, liquid hydrocarbon effluent is withdrawn from the lower part of the high pressure separator, and aqueous water phase containing dissolved $NH_3$ and $H_2S$ is withdrawn from the bottoms of the high pressure separator. As mentioned previously, water is injected into the hydroconversion reactor effluent prior to cooling the reactor effluent down to between 100 and 150° F. Usually the water is injected while the reactor effluent is at a relatively high temperature as, for example, 400° F. or above. At the high temperature, the likelihood of solids formation is substantially reduced as opposed to the likelihood of formation at lower temperatures.

By virtue of the water injected into the reactor effluent, reactor effluent heat exchangers and piping are exposed to an aqueous liquid which contains dissolved hydrogen sulfide and ammonia. Data accumulated through operating experience has shown that in a high percentage of existing hydroconversion plants severe corrosion has accompanied the presence of the aqueous sulfidic fluids.

Modern hydrocracking was introduced in 1959 by Chevron Research Company. Since that time several other competitive hydrocracking processes have been developed. While certain differences exist between these processes, they all pose a common problem of corrosion due to attack by aqueous sulfidic fluids.

In a typical two-stage hydrocracking plant, aqueous corrosion is experienced mostly in the first stage reaction products cooler (usually an air-cooled exchanger) and in the associated piping. Corrosion occurs primarily within the temperature range of 100 to 400° F. A typical example of where corrosion occurs is the elbow at the outlet of the first stage effluent cooler.

When this corrosion phenomenon was first encountered it was regarded as another manifestation of acidic corrosion caused by the presence of hydrogen sulfide in water.

It was also thought possible that wash water introduced to remove deposits such as ammonium sulfide and ammonium hydrosulfide, might contain dissolved oxygen which would tend to increase corrosion by wet hydrogen sulfide. However, analysis tended to discredit this theory of acidic corrosion. Analyses of water samples from a number of plants showed the water to be alkaline rather than acidic: pH values as high as 9.3 were noted. It became evident that extremely severe corrosion was experienced in plants that utilized high nitrogen feedstocks even though feed sulfur contents were lower than feedstocks to certain of the plants which were only nominally corrosive.

SUMMARY OF THE INVENTION

The present invention is based partly on the finding that in hydroconversion plants where exchangers and piping are exposed to sour water, a increase in ammonia concentration even at a given hydrogen sulfide concentration will tend to increase the severity of corrosion in many instances.

According to the present invention an improved process is provided for controlling corrosion in the effluent lines from a hydroconversion reactor wherein organic compounds containing nitrogen and sulfur are reacted with hydrogen, and $NH_3$ and $H_2S$ are formed and are water-washed from the reactor effluent, and the reactor effluent together with the water-wash solution is introduced to a vapor-liquid separator wherein recycle hydrogen is withdrawn as a gas and the water-wash solution containing $NH_3$ and $H_2S$ is withdrawn as an aqueous phase, which comprises: washing the reactor effluent with at least 5 pounds of water per pound of $H_2S$ in the reactor effluent and an additional amount of water sufficient to maintain the $NH_4HS$ concentration in the water-wash solution withdrawn from the separator below 1.1 mole percent.

Maintaining $NH_4HS$ concentration below 1.1 mole percent has been found to be beneficial for reducing the severity of corrosion. Generally, the $NH_4HS$ present in the water-wash solution is approximately equivalent to the amount of $NH_3$ and $H_2S$ present in the reactor effluent *on an equal molar basis*.

DETAILED DESCRIPTION

Figure 1:
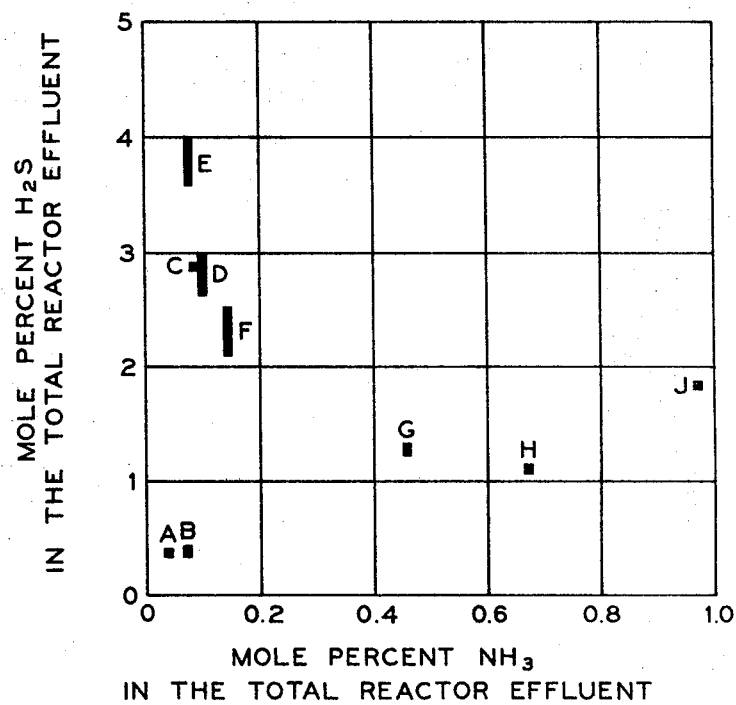
FIG. 1 is a graph showing the mole percent $H_2S$ as the ordinate and the mole percent $NH_3$ as the abscissa in the total reactor effluent for various hydroconversion plants.

Referring now in more detail to FIG. 1, the FIG. 1 composition diagram gives the hydrogen sulfide and ammonia contents in the total effluent streams from a number of first stage hydroconversion reactor systems. As can be seen a wide variation existed in the compositions.

It is interesting to note that essentially no corrosion has been experienced in the plants represented by points A and B; points C and D represent moderate corrosion; points E and F represent somewhat greater than moderate corrosion; and the plants represented by data points G, H and J had severe corrosion.

There are a number of factors which prevented a derivation of any crystal clear correlation. The primary factor preventing a clear correlation is the fact that ammonium hydrosulfide concentrations in the aqueous liquid phase were not available. Also, the velocity of the reactor effluent in the effluent piping was determined to be a substantial factor affecting corrosion. The relation between reactor effluent velocity and corrosion in hydroconversion reactor effluent piping is discussed in my application Ser. No. 796,152, entitled "Corrosion Control in Hydroconversion Effluent Piping by Velocity Control," filed Feb. 3, 1969, which application is incorporated by reference into the present patent application.

Figure 2:
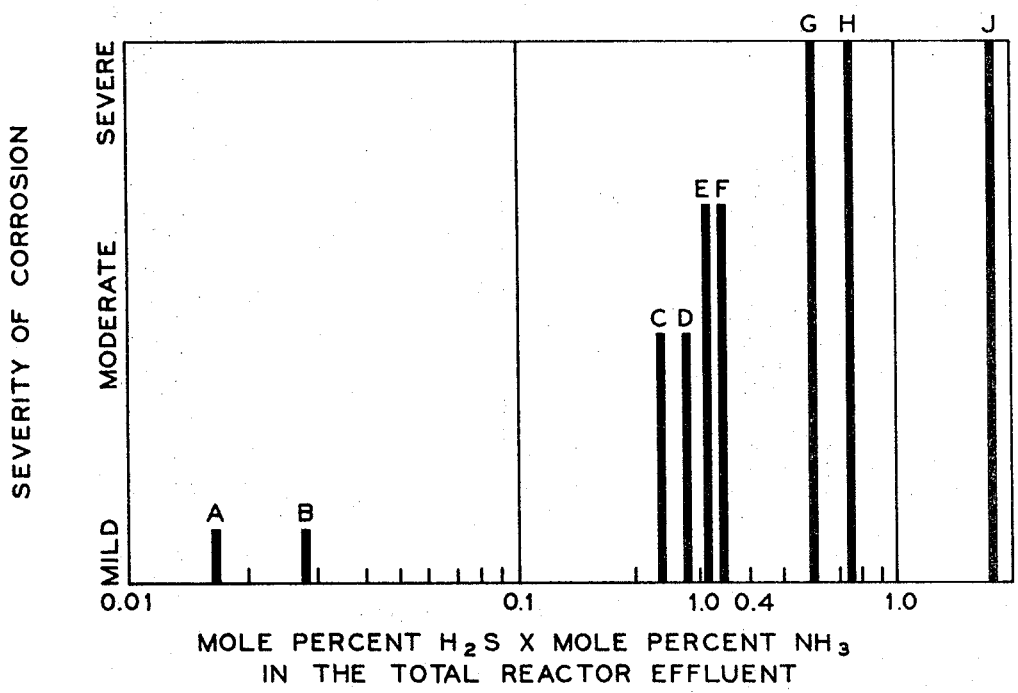
FIG. 2 shows the severity of corrosion on a relative basis versus the mole percent $H_2S$ times the mole percent $NH_3$ in the total reactor effluent for various hydroconversion plants. In attempting to analyze ammonium hydrosulfide concentrations, the lack of actual direct analytical data made it convenient to work with gross concentrations of ammonia and hydrogen sulfide in the *total reactor effluent* stream, although it would have been greatly preferred to have the ammonium hydrosulfide concentrations in the aqueous liquid phase at various points in the effluent piping. Because the amount of aqueous liquid phase increases as the reactor effluent is cooled down, it is of course apparent that in most instances the ammonium hysulfide concentration in the aqueous phase continues to decrease with the decrease in reactor effluent temperature.

However, the data collected would appear to indicate that as the amount of ammonia available to form ammonium hydrosulfide in the aqueous liquid phase increased at a given $H_2S$ concentration the corrosion became more severe. FIG. 2 read in conjunction with FIG. 1 shows that severe corrosion was experienced when the mole percent $NH_3$ in the total reactor effluent rose above about 0.4 mole percent. It was also determined that for corrosion as indicated by G, H and J on the two figures the amount of $NH_4HS$ was greater than about 3 to 4 mole percent in the separator aqueous liquid phase in most instances. On the other hand for the less corrosive plants as indicated by points C, D, E and F, the $NH_4HS$ content of the aqueous liquid phase in the recycle hydrogen gas separator following the hydroconversion reactor was about 1.1 mole percent or less. Thus, it appears advantageous from a standpoint of reducing corrosion to use sufficient water to maintain the $NH_4HS$ concentration below about 1.1 mole percent.

EXAMPLE

In this example a hydrocracker reactor effluent which contains 200 moles per hour $H_2S$ and 50 moles per hour $NH_3$ is considered. For $H_2S$ scrubbing, 5 pounds of $H_2O$ is added per pound of $H_2S = 5 \times 200 \times 34 = 34,000$ lb./hr. of $H_2O$. The total moles for the resulting aqueous solution, assuming essentially all the $H_2S$ and $NH_3$ goes into the solution, is 2140 moles per hour (1890 moles $H_2O$, 200 moles $H_2S$, and 50 moles $NH_3$). Therefore, the mole percent $NH_4HS$ is 2.34 percent. Since the 2.34 percent is greater than the 1.1 mole percent maximum allowable according to the present invention, additional water must be added. The additional water which must be added to have the $NH_4HS$ concentration equal to 1.1 mole percent is 2410 moles per hour $H_2O$.

Although various specific embodiments of the invention have been described and shown, it is to be understood they are meant to be illustrative only and not limiting. Certain features may be changed without departing from the spirit or essence of the invention. It is apparent that the present invention has broad application to corrosion control where $NH_3$ and $H_2S$ are present together with $H_2O$. Accordingly, the invention is not to be construed as limited to the specific embodiments illustrated but only as defined in the appended claim.

I claim:

1. In a process for controlling corrosion in the effluent lines from a hydroconversion reactor wherein organic compounds containing nitrogen and sulfur are reacted with hydrogen, and $NH_3$ and $H_2S$ are formed and are water-washed from the reactor effluent, and the reactor effluent together with the water-wash solution is introduced to a vapor-liquid separator wherein recycle hydrogen is withdrawn as a gas and the water-wash solution containing $NH_3$ and $H_2S$ is withdrawn as an aqueous phase, the improvement which comprises: injecting into the reactor effluent at least 5 pounds of water per pound of combined $H_2S$ and $NH_3$ in the reactor effluent and injecting an additional amount of water sufficient to maintain the $NH_4HS$ concentration below 1.1 mole percent in the water-wash solution withdrawn from the separator.

References Cited

UNITED STATES PATENTS 3,157,590  11/1964  Scott et al. _____ 208—111
3,189,537  6/1965  Carlton _____ 208—47

OTHER REFERENCES

"How Fluid Velocity Affects Corrosion," Canadian Chem. Processing, 51 (5), 73–75 (May 1967).

DELBERT E. GANTZ, Primary Examiner

G. E. SCHMITKONS, Assistant Examiner

U.S. Cl. X.R.

208—108; 260—672